(12) United States Patent
Pulla et al.

(10) Patent No.: US 11,914,880 B2
(45) Date of Patent: *Feb. 27, 2024

(54) OFFLINE DATA TRANSFER BETWEEN DEVICES USING GESTURES

(71) Applicant: Bank of America Corporation, Charlotte, NC (US)

(72) Inventors: Kiran Pulla, Hyderabad (IN); Mohan Beela, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,823

(22) Filed: Nov. 1, 2022

(65) Prior Publication Data

US 2023/0085733 A1  Mar. 23, 2023

Related U.S. Application Data

(63) Continuation of application No. 17/385,775, filed on Jul. 26, 2021, now Pat. No. 11,556,264.

(51) Int. Cl.

| | |
|---|---|
| G06F 3/06 | (2006.01) |
| H04W 4/02 | (2018.01) |
| H04W 4/021 | (2018.01) |
| G06F 3/01 | (2006.01) |
| G06Q 20/34 | (2012.01) |

(52) U.S. Cl.
CPC ............ *G06F 3/0646* (2013.01); *G06F 3/017* (2013.01); *G06F 3/0604* (2013.01); *G06F 3/067* (2013.01); *G06F 3/0653* (2013.01); *G06Q 20/352* (2013.01); *H04W 4/021* (2013.01); *H04W 4/023* (2013.01)

(58) Field of Classification Search
CPC ...... G06F 3/017; G06F 3/0604; G06F 3/0646; G06F 3/0653; G06F 3/067; H04W 4/021; H04W 4/023; G06Q 20/352
See application file for complete search history.

(56) References Cited

U.S. PATENT DOCUMENTS

| | | |
|---|---|---|
| 722,333 A | 3/1903 | Friedrich |
| 7,426,574 B2 | 9/2008 | Liao |
| 8,073,839 B2 | 12/2011 | Rathod |
| 8,868,437 B2 | 10/2014 | Menschik et al. |
| 9,307,403 B2 | 4/2016 | Neafsey et al. |
| 9,311,639 B2 | 4/2016 | Filler |
| 9,406,063 B2 | 8/2016 | Zhou et al. |

(Continued)

FOREIGN PATENT DOCUMENTS

| | | |
|---|---|---|
| CN | 105190659 A | 12/2015 |
| CN | 105408910 A | 3/2016 |

(Continued)

*Primary Examiner* — Jeong S Park

(57) ABSTRACT

A system is provided including a first server storing a first data file for a first user, a second server storing a second data file for a second user, a first data card of the first user registered with the first server and locally storing a portion of the first data file, and a second data card of the second user registered with the second server and associated with the second data file. The first data card detects a pairing gesture between the first and second data cards, and in response, establishes a peer-to-peer connection between the data cards.

15 Claims, 6 Drawing Sheets

(56) References Cited

U.S. PATENT DOCUMENTS

| | | | |
|---|---|---|---|
| 9,646,300 B1 | 5/2017 | Zhou et al. | |
| 9,704,151 B2 | 7/2017 | Zhou et al. | |
| 9,710,804 B2 | 7/2017 | Zhou et al. | |
| 9,830,588 B2 | 11/2017 | Davis et al. | |
| 9,830,589 B2 | 11/2017 | Xing | |
| 9,955,505 B2 | 4/2018 | Vandwalle et al. | |
| 9,965,756 B2 | 5/2018 | Davis et al. | |
| 10,055,714 B2 | 8/2018 | Zhou et al. | |
| 10,147,076 B2 | 12/2018 | Zhou et al. | |
| 10,270,587 B1 | 4/2019 | Wu | |
| 10,366,378 B1 | 7/2019 | Han et al. | |
| 10,402,815 B2 | 9/2019 | Sharma et al. | |
| 10,404,475 B2 | 9/2019 | O'Regan et al. | |
| 10,872,345 B1* | 12/2020 | Walters | G06Q 20/204 |
| 10,972,257 B2 | 4/2021 | Saint et al. | |
| 11,042,954 B2 | 6/2021 | Yoon et al. | |
| 11,556,264 B1* | 1/2023 | Pulla | G06Q 20/4097 |
| 2007/0188323 A1* | 8/2007 | Sinclair | G06F 3/017 |
| | | | 340/568.1 |
| 2008/0195735 A1* | 8/2008 | Hodges | G05B 19/042 |
| | | | 709/227 |
| 2014/0100973 A1 | 4/2014 | Brown et al. | |
| 2014/0258110 A1 | 9/2014 | Davis et al. | |
| 2015/0026072 A1 | 1/2015 | Zhou et al. | |
| 2016/0125403 A1 | 5/2016 | Hu et al. | |
| 2016/0300237 A1 | 10/2016 | Khan et al. | |
| 2018/0032993 A1 | 2/2018 | Park et al. | |
| 2018/0330346 A1 | 11/2018 | Grassadonia et al. | |
| 2019/0059122 A1 | 2/2019 | Neafsey et al. | |
| 2019/0213581 A1* | 7/2019 | Zarakas | G06Q 20/3674 |
| 2019/0349361 A1 | 11/2019 | Brown et al. | |
| 2020/0372489 A1 | 11/2020 | Liu et al. | |
| 2021/0012348 A1 | 1/2021 | Anantharaju | |
| 2021/0241284 A1* | 8/2021 | Walters | G06Q 20/204 |
| 2022/0138725 A1* | 5/2022 | Sneider | G06Q 20/351 |
| | | | 705/41 |
| 2022/0138746 A1* | 5/2022 | Rodriguez | G07F 19/201 |
| | | | 705/43 |

FOREIGN PATENT DOCUMENTS

| | | |
|---|---|---|
| CN | 111386545 A | 7/2020 |
| EP | 1229443 B1 | 3/2007 |
| EP | 3186739 B1 | 7/2019 |
| JP | 2016197767 A | 11/2016 |
| JP | 6742912 B2 | 8/2020 |
| KR | 101321875 B1 | 10/2013 |
| RU | 2482635 C2 | 5/2013 |
| RU | 2665869 C2 | 9/2018 |
| TW | 1722333 B | 3/2021 |

\* cited by examiner

OFFLINE DATA TRANSFER BETWEEN DEVICES USING GESTURES

CROSS-REFERENCE TO RELATED APPLICATION

The application is a continuation of U.S. patent application Ser. No. 17/385,775, filed Jul. 26, 2021 by Kiran Pulla et. al, and entitled "OFFLINE DATA TRANSFER BETWEEN DEVICES USING GESTURES," which is incorporated herein by reference.

TECHNICAL FIELD

The present disclosure relates generally to data processing, and more specifically to offline data transfer between devices using gestures.

BACKGROUND

A computing infrastructure generally includes several data servers connected to a network such as the internet. Generally, data can be exchanged between data files stored on the same data server or different data servers upon request from registered users. However, to execute the data transfer between data files, the data server(s) as well as a computing device being used by the user to request the data transfer must be connected to a network such as the internet. For example, to request a data transfer from a first data file stored on a first data server connected to the internet to a second data file stored on a second server also connected to the internet, the user may need to connect a computing device of the user to the internet and communicate with the first server and/or the second server over the internet to request the data transfer. The user cannot initiate data transfers between data files stored at one or more servers without access to a network such as the internet that enables the user to communicate with the one or more servers and initiate the data transfers.

SUMMARY

The system and methods implemented by the system as disclosed in the present disclosure provide technical solutions to the technical problems discussed above by allowing a user to initiate a data exchange between data files stored on one or more data servers when the user is outside network coverage and unable to connect to a network such as the internet. The disclosed system and methods provide several practical applications and technical advantages. For example, the disclosed system provides the practical application of allowing a first user to transfer data from a first data file stored for the first user on a first data server to a second data file stored for a second user on the same or a different data server without needing to request the data transfer over a network such as the internet, for example, when the first user is outside network coverage. As described below, a first data card of the first user may be registered with the first data server and a second data card of the second user may be registered with the second data server. Whenever the first data card is in a region having network coverage, the first data card connects to the network and synchronizes with the first data server so that at least a portion of the first data file is copied to the first data card. Similarly, whenever the second data card is in a region having network coverage, the second data card connects to the network and synchronizes with the second data server so that at least a portion of the second data file is copied to the second data card. Subsequently, when the first and second data cards are in a geographical region having no network coverage, data may be exchanged between the first and second data cards over a peer-to-peer connections between the data cards. The next time each of the first and second data cards are back in network coverage and are able to connect to the network, the data cards synchronize again with the respective data server so that the offline data interactions performed between the two data cards are reflected in the first and second data files at the first and second data servers. Thus, the data transfer between the first and second data cards over the peer-to-peer connection between the data cards (when the data cards are out of network coverage) amounts to an indirect data transfer between the first and second data servers. Thus, the system and method described in accordance with embodiments of the present disclosure allow a user to perform a data transfer between data files stored at the same or different data servers when the user is outside network coverage by performing a data transfer between data cards registered with the respective data files over a peer-to-peer connection between the data cards without needing to connect to a network to request the data transfer.

The disclosed system and methods provide an additional practical application of providing a quick and secure method of transferring data between data cards. For example, as described below, a first data card may be configured to detect pre-configured gestures related to a data interaction between the first data card and a second data card, based on sensor data collected from sensors included in the first data card. For example, when the sensors of the first data card detect the second data card moving from left to right relative to the first data card in close proximity, the first data card may be configured to detect a pairing gesture. On the other hand, when the sensors of the first data card detect the second data card moving from top to bottom relative to the first data card in close proximity, the first data card may be configured to detect a transfer gesture.

In one example use case when the first user desires to transfer data from a first local data file stored at the first data card to a second local data file stored at the second data card, the first user first performs a pairing gesture by moving the first data card left to right relative to the second data card within a pre-selected distance from the second data card. The relative movement of the data cards is recorded by the sensors on both data cards and interpreted by respective data cards as a pairing gesture. In response to detecting the pairing gesture, the data cards establish a peer-to-peer connection between them. Once a peer-to-peer connection is established between the first data card and the second data card, the first user may authenticate the data transfer from the first data card to the second data card by inputting a unique key using a data input device provided at the first data card. Thereafter, the first user performs a transfer gesture by moving the first data card top to bottom relative to the second data card within the pre-selected distance from the second data card. This relative movement of the data cards is recorded by the sensors on both data cards and interpreted by the data cards as a transfer gesture. In response to detecting the transfer gesture, the first data card may initiate transfer of the data from the first local data file to the second data card over the already established peer-to-peer connection. The second data card may prepare to receive the data from the first data card in response to detecting the transfer gesture. The second data card may store the received data in the memory of the second data card.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
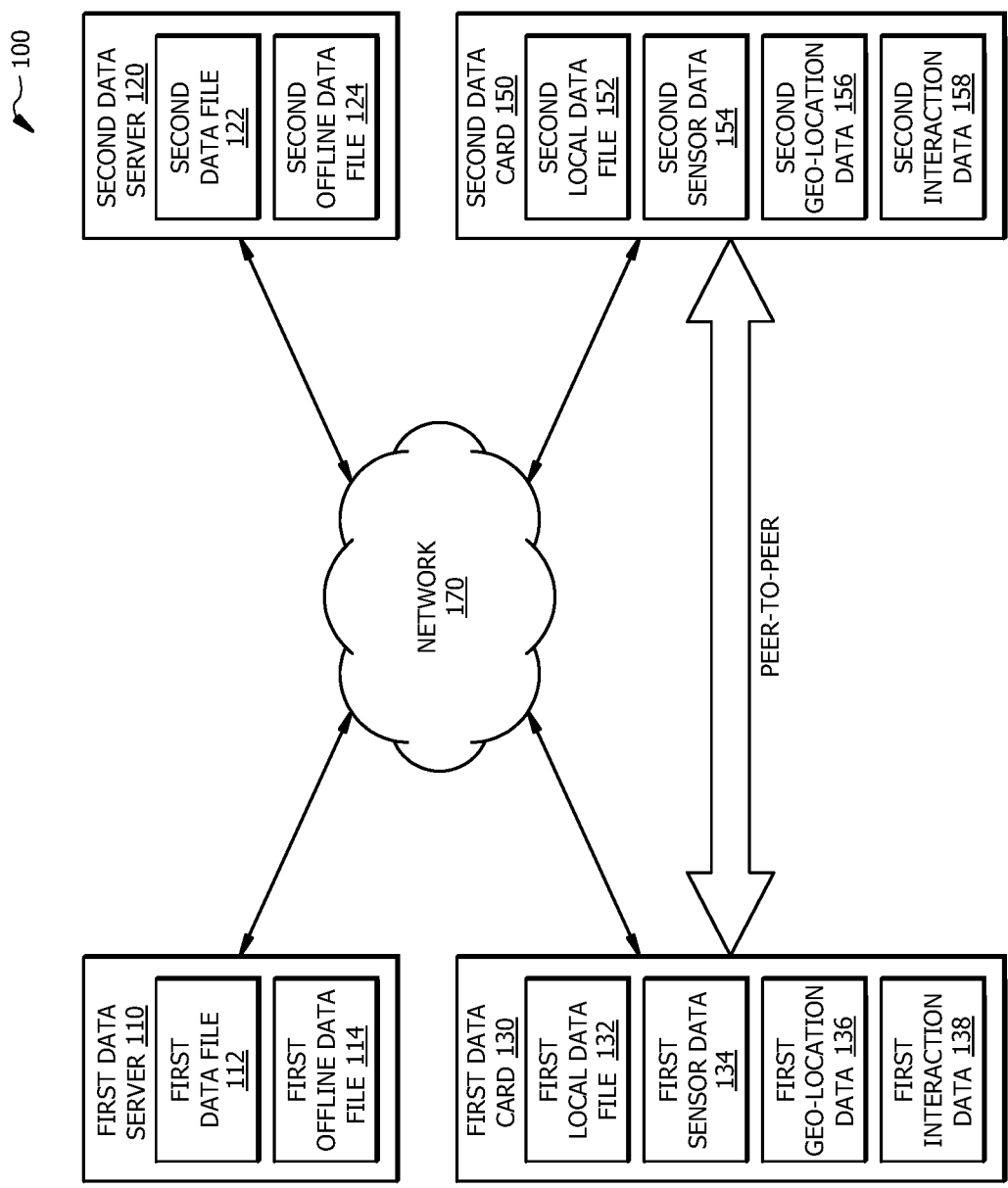
FIG. 1 is a schematic diagram of an example data processing system, in accordance with certain embodiments of the present disclosure.

FIG. 1 is a schematic diagram of an example data processing system 100, in accordance with certain embodiments of the present disclosure.

As shown in FIG. 1, data processing system 100 includes a first data server 110, a second data server 120, a first data card 130 and a second data card 150, each capable of connecting to a network 170. The network 170, in general, may be a wide area network (WAN), a personal area network (PAN), a cellular network, or any other technology that allows devices to communicate electronically with other devices. In one or more embodiments, the network 170 may be the Internet.

First data server 110 may store for a first user, a first data file 112 and a first offline data file 114 associated with the first data file 112. The first user may be registered with the first data server 110 to maintain the first data file 112 and the associated first offline data file 114 at the first data server 110. The first data file 112 may store data for the first user. The first offline data file 114 may be linked to the first data file 112 and may store a portion of the data from the first data file 112. For example, the first data server 110 may be configured to transfer a portion of the first user's data from the first data file 112 to the first offline data file 114, based on selections made by the first user. For example, the first user may configure the first data server 110 to transfer the portion of the data from the first data file 112 to the first offline data file 114. In one embodiment, the first data server 110 may be configured to maintain a pre-selected amount of user data in the first offline data file 114. For example, as and when the user data in the first offline data file 114 falls below the pre-selected amount, first data server 110 may be configured to transfer additional data from the first data file 112 to the first offline data file 114 to keep the amount of data in the first offline data file 114 at or above the pre-selected amount of data.

Similarly, the second data server 120 may store for a second user, a second data file 122 and a second offline data file 124 associated with the second data file 122. The second user may be registered with the second data server 120 to maintain the second data file 122 and the associated second offline data file 124 at the second data server 120. The second data file 122 may store data for the second user. The second offline data file 124 may be linked to the second data file 122 and may store a portion of the data from the second data file 122. For example, the second data server 120 may be configured to transfer a portion of the second user's data from the second data file 122 to the second offline data file 124, based on selections made by the second user. For example, the second user may configure the second data server 120 to transfer the portion of the data from the second data file 122 to the second offline data file 124. In one embodiment, the second data server 120 may be configured to maintain a pre-selected amount of user data in the second offline data file 124. For example, as and when the user data in the second offline data file 124 falls below the pre-selected amount, second data server 120 may be configured to transfer additional data from the second data file 122 to the second offline data file 124 to keep the amount of data in the second offline data file 124 at or above the pre-selected amount of data.

In one embodiment, the first user may be registered with both the first data server 110 and the second data server 120. In this case, the second data file 122 and the associated second offline data file 124 may also belong to the first user. In other words, the first data file 112 and the associated first offline data file 114 stored at the first data server 110, as well as the second data file 122 and associated second offline data file 124 may belong to the same user. In an additional or alternative embodiment, the first data server 110 may include the second data server 120 or vice versa. For example, the first data server 110 and the second data server 120 may be part of a single processing entity.

First data card 130 may belong to the first user and may be registered with the first data server 110 and linked to the first offline data file 114 of the first user. As shown in FIG. 1, the first data card 130 may store a first local data file 132 which may include at least a portion of the first offline data file 114. For example, the first data card 130 may be configured to synchronize the first local data file 132 with the first offline data file 114 over the network 170 such that the first local data file 132 is a copy of the first offline data file 114 right after the synchronization is completed. The first data card 130 may be configured to synchronize the first local data file 132 with the first offline data file 114 over the network 170 according to a pre-determined schedule (e.g., periodically).

Similarly, the second data card 150 may belong to the second user and may be registered with the second data server 120 and linked to the second offline data file 124. As shown in FIG. 1, the second data card 150 may store a second local data file 152 which may include at least a portion of the second offline data file 124. For example, the second data card 150 may be configured to synchronize the second local data file 152 with the second offline data file 124 over the network 170 such that the second local data file 152 is a copy of the second offline data file 124 right after the synchronization is completed. The second data card 150 may be configured to synchronize the second local data file 152 with the second offline data file 124 over the network 170 according to a pre-determined schedule (e.g., periodically).

As shown in FIG. 1, first data card 130 may further store first sensor data 134 obtained from sensors built into the first data card 130 (as described below). First data card 130 may further store first geo-location data 136 indicating a geographical location of the first data card 130. The first geo-location data 136 may be collected by a Global Positioning System (GPS) device built into the first data card 130 (as described below). Similarly, the second data card 150 may further store second sensor data 154 obtained from sensors built into the second data card 150 (as described below). Second data card 150 may further store second geo-location data 156 indicating a geographical location of the second data card 150. The second geo-location data 156 may be collected by a GPS device built into the second data card 150 (as described below). The first data card 130 and the second data card 150 may further store first interaction data 138 and second interaction data 158 respectively. As described below the interaction data 138 and 158 may include information relating to data interactions (e.g., data transmissions and data reception) between the first data card 130 and the second data card 150.

As described below, each of the first data card 130 and the second data card 150 may be configured to exchange data (e.g., transmit data or receive data) with the other of the two data cards 130 and 150 when either or both data cards 130 and 150 are not connected to the network 170 (e.g., internet). For example, the first data card 130 may be configured to exchange data with the second data card 150 when both data cards 130 and 150 are collocated and out of network coverage. As described below, each of the data cards 130 and 150 may be configured to transmit data to the other one of the two data cards 130 and 150 over a peer-to-peer connection between the two data cards 130 and 150. The first data card 130 may be configured to transmit data from the first local data file 132 to the second local data file 152 at the second data card 150. The first data card 130 may also be configured to receive data from the second local data file 152 at the second data card 150 and store the received data in the first local data file 132. The second data card 150 may similarly transmit data to and receive data from the first local data file 132 of the first data card 130. Since the first local data file 132 includes data from the first offline data file 114 (stored at the first data server 110) and the second local data file 152 includes data from the second offline data file 124 (stored at the second data server 120), an offline data transfer between the first local data file 132 and the second local data file 152 essentially amounts to data transfer between the first offline data file 114 and the second offline data file 124. Thus, embodiments of the present disclosure allow a user to initiate a data transfer between two data servers (e.g., 110 and 120) without the user needing to connect a user device to a network (e.g., network 170) such as the internet to initiate the data transfer. As described in more detail below, a data transfer between the first data server 110 and the second data server 120 may be indirectly performed by initiating an offline data transfer between the first data card 130 and the second data card 150 each of which can locally store a portion of the data from the respective data servers 110 and 120.

It may be noted that while embodiments of the present disclosure are useful for exchanging data between the data cards 130 and 150 when either or both of the data cards 130 and 150 are outside network coverage, it can be appreciated that the embodiments of the present disclosure apply to data exchange between the data cards 130 and 150 when either or both data cards 130 and 150 are connected to the network 170.

In one or more embodiments, each of the first data server 110, the second data server 120, the first data card 130 and the second data card 150 may be implemented by a computing device running one or more software applications. For example, one or more of the first data server 110, the second data server 120, the first data card 130 and the second data card 150 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the first data server 110, the second data server 120, the first data card 130 and the second data card 150 may be representative of a server running one or more software applications to implement respective functionality as described below. In certain embodiments, one or more of the first data server 110, the second data server 120, the first data card 130 and the second data card 150 may run a thin client software application where the processing is directed by the thin client but largely performed by a central entity such as a server (not shown).

Figure 2:
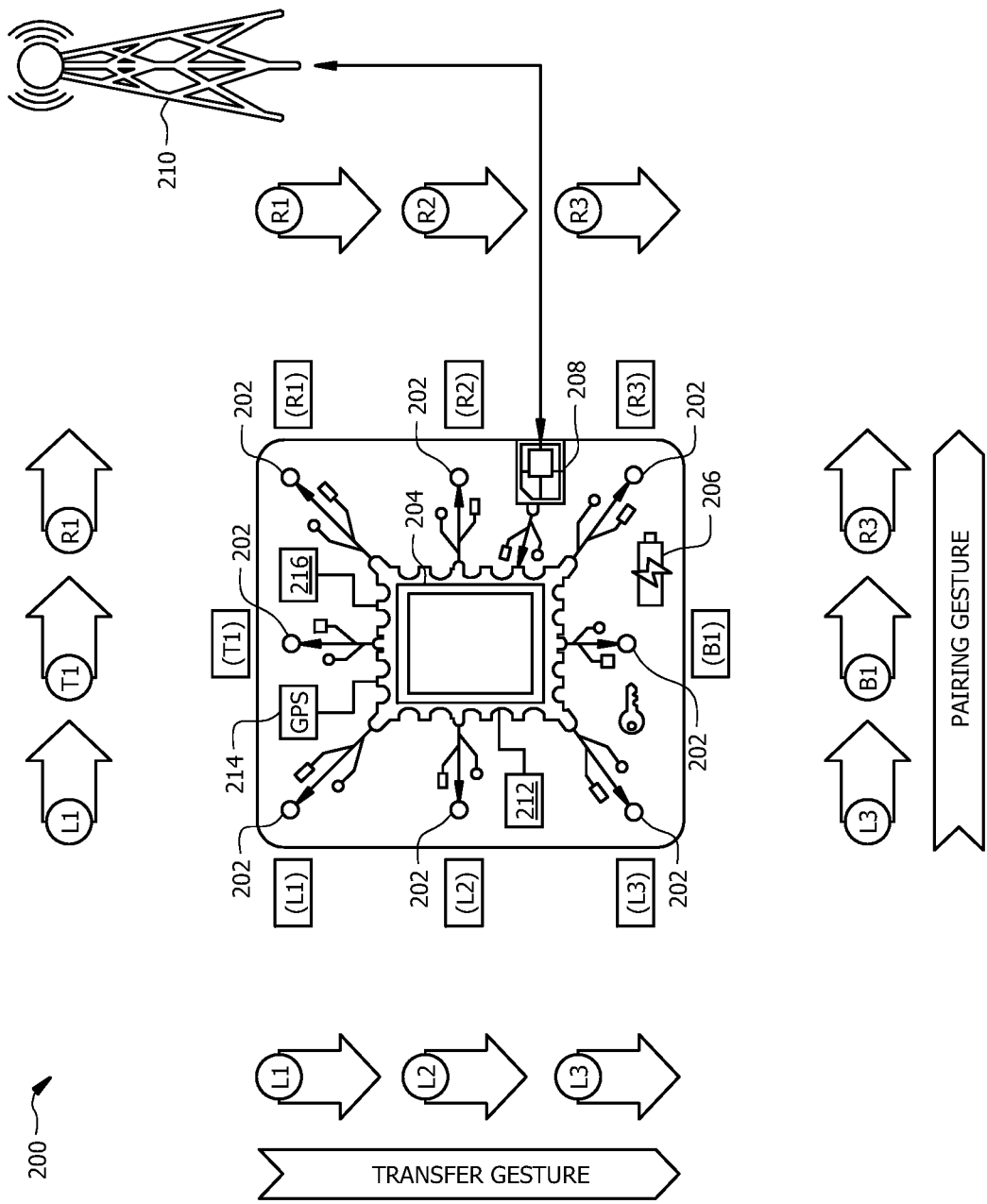
FIG. 2 illustrates an example data card, in accordance with certain embodiments of the present disclosure.

FIG. 2 illustrates an example data card 200, in accordance with certain embodiments of the present disclosure. Data card 200 may be representative of either or both the first data card 130 and the second data card 150. In one embodiment, data card 200 may be representative of both the first data card 130 and the second data card 150, in which case the first data card 130 and the second data card 150 are identical.

As shown in FIG. 2, data card 200 may include a microprocessor 204, a memory device 212, sensors 202, a Subscriber Identity Module (SIM) 208, a Global Positioning System (GPS) device 214, a haptic device 216 and a battery 206.

Battery 206 provides electric power to one or more electric components of the data card 200 including one or more of the microprocessor 204, memory device 212, sensors 202, SIM 208, GPS device 214 and haptic device 216.

Memory device 212 may be configured to store data relating to the data card 200. For example, memory device 212 of the first data card 130 may be configured to store the first local data file 132, the first sensor data 134, the first geo-location data 136 and the first interaction data 138. Similarly, memory device 212 of the second data card 150 may be configured to store the second local data file 152, the second sensor data 154, the second geo-location data 156 and the second interaction data 158. Memory device 212 may additionally store instructions that can be processed by the microprocessor 204 to perform operations related to the data card 200 as described in accordance with one or more embodiments of the present disclosure.

The GPS device 214 may be configured to detect a geographical location of the data card 200. The GPS device 214 may be configured to detect the geographical location of the data card 200 according to a pre-configured schedule (e.g., periodically). The geo-location data obtained from the GPS device 214 may be recorded and stored in the memory device 212 of the data card 200. For example, the first data card 130 may store the geo-location data obtained from the GPS device 214 of the first data card 130 as first geo-location data 136. The second data card 150 may store the geo-location data obtained from the GPS device 214 of the second data card 150 as second geo-location data 156. Each of the first data card 130 and the second data card 150 may be configured to transmit the respective geo-location data 136 and 156 to the respective data servers 110 and 120.

In one or more embodiments, each of the first data server 110 and the second data server 120 may be configured to activate the respective first offline data file 114 and the second offline data file 124 based on the respective geo-location data 136 and 156 received from the respective first data card 130 and the second data card 150. For example, the first data server 110 may be configured to determine whether the first data card 130 is outside a designated region and/or within a designated region based on the first geo-location data 136 received from the first data card 130. When the first data server 110 is configured to determine whether the first data card 130 is outside a designated region, the designated region may generally have network coverage and at least a portion of a region outside the designated region may not have network coverage. When the first data server 110 is configured to determine whether the first data card 130 is within a designated region, at least a portion of the designated region may not have network coverage. The first data server 110 may be configured to keep the first offline data file 114 and the first data card 130 de-activated until the first data card 130 is detected outside a designated region or within a designated region whichever the case may be. De-activating the first offline data file 114 may include deleting all data from the first offline data file 114. This may include transferring all data from the first offline data file 114 to the first data file 112. When the first offline data file 114 is empty, a next data synchronization between the first offline data file 114 and the first local data file 132 deletes all data from the first local data file 132 and consequently deactivates the first data card 130. The first data server 110 may be configured to activate the first offline data file 114 and the first local data file 132 in response to detecting that the first data card is outside a designated region or within a designated region, whichever the case may be. Activating the first offline data file 114 may include transferring a pre-selected portion of data from the first data file 112 to the first offline data file 114. When the first offline data file 114 has data, a next data synchronization between the first offline data file 114 and the first local data file 132 copies the data from the first offline data file 114 to the first local data file 132, consequently activating the first data card 130 for offline data exchanges with another data card (e.g., second data card 150).

In an example use case, when the first data card 130 is in network coverage and able to connect to the network 170 (e.g., internet), this may mean that the first user can connect a user device to the network 170 to request a data transfer between the first data server 110 and the second data server 120. In this case, since a direct data transfer may be initiated between the first data server 110 and the second data server 120, there is no need for an indirect data transfer between the data servers 110 and 120 via a data transfer between the first data card 130 and the second data card 150 over a peer-to-peer connection between the data cards 130 and 150. However, the indirect data transfer may be needed when the first data card 130 is not in network coverage (e.g., outside designated region and/or within a designated region), which may mean that the first user may not be able to connect a user device to the network 170 to initiate the direct data transfer between data servers 110 and 120. By activating the first offline data file 114 and the first data card 130 when the first data card 130 is detected outside a designated region or within a designated region, first data server 110 may ensure that indirect data transfer between data servers 110 and 120 via offline peer-to-peer data transfer between data cards 130 and 150 is enabled when the first user is outside network coverage and cannot initiate a direct data transfers between data servers 110 and 120 over the network 170.

SIM 208 may be configured to connect data card 200 to a cellular data network (e.g., a portion of network 170) when data card 200 is within network coverage. The SIM 208 allows the data card 200 to connect to a cellular base station 210 to provide network access to the data card 200. When in network coverage and connected to a data network, first data card 130 may be configured to synchronize (e.g. periodically) contents of the first local data file 132 with the first offline data file 114 stored at the first data server 110. Similarly, when in network coverage and connected to a data network, second data card 150 may be configured to synchronize (e.g. periodically) contents of the second local data file 152 with the second offline data file 124 stored at the second data server 120.

Haptic device 216 may be configured to generate a haptic feedback in response to events occurring at the data card 200. Haptic device 216 may include an electro-mechanical device that can generate haptic feedback for the user by applying forces, vibrations or motions to the user. The haptic device 216 may be configured to generate the haptic feedback in response to a successful pairing operation and/or a successful data transfer operation as described below.

Sensors 202 may be configured to detect movement of another data card in a particular direction relative to the data card 200 within close proximity of the data card 200. For example, when data card 200 represents the first data card 130, sensors 202 can detect the second data card 150 moving in close proximity (e.g., within a pre-selected distance) to the first data card 130 in a particular direction. As shown, sensors 202 may include three left sensors L1, L2 and L3 provided near a left edge of the data card 200, three right sensors R1, R2, and R3 provided near a right edge of the data card 200, one top sensor T1 provided near the center of a top edge of the data card 200, and one bottom sensor B1 provided near the center of a bottom edge of the data card 200. Each of the sensors 202 may include any type of sensor that can detect movement of another data card within a pre-selected distance from the data card 200. For example, one or more of the sensors 202 may include a proximity sensor capable of detecting the presence of nearby objects within a nominal range. Data card 200 may be configured to locally store sensor data collected by each sensor 202 in memory device 212. For example, first data card 130 may store sensor data collected from sensors 202 as first sensor data 134. Similarly, second data card 150 may store sensor data collected from similar sensors 202 as second sensor data 154.

Microprocessor 204 may be configured to detect pre-configured gestures related to a data interaction between data card 200 and another data card, based on the sensor data collected from sensors 202. For example, when the sensors 202 detect another data card moving from left to right relative to the data card 200 (e.g., direction aligned with L1>T1>R1, L3>B1>R3, L2>R2 or a combination thereof), the microprocessor 204 may be configured to detect a pairing gesture. For example, when another card is moved from left to right direction over data card 200 in close proximity, each of the sensors L1, T1, and R1 detect the other card in close proximity to the sensor one by one in sequence. That is, L1 first detects the other card in close proximity of L1, then T1 detects the other card in close proximity of T1, and finally R1 detects the other card in close proximity of the R1. This sequence of detection of the other card by sensors L1, T1, and R1 can be interpreted by the microprocessor 204 as the other card moving from left to right relative to the card 200. The movement of the other card from left to right relative to card 200 may be detected based on a similar sequence of detection by sensors "L3>B1>R3" or "L2>R2". The microprocessor 204 may be configured to detect the pairing gesture based on movement of the other card detected by sensors L1>T1>R1, L3>B1>R3, L2>R2 or a combination thereof. The microprocessor 204 may be configured to establish a peer-to-peer connection with the other card in response to detecting a pairing gesture.

On the other hand, for example, when the sensors 202 detect another data card moving from top to bottom relative to the data card 200 (e.g., direction aligned with L1>L2>L3, R1>R2>R3, T1>B1 or a combination thereof), the microprocessor 204 may be configured to detect a transfer gesture. For example, when another card is moved from top to bottom direction over card 200 in close proximity, each of the sensors L1, L2, and L3 detect the other card in close proximity to the sensor one by one in sequence. That is, L1 first detects the other card in close proximity of L1, then L2 detects the other card in close proximity of L2, and finally L3 detects the other card in close proximity of the L3. This sequence of detection of the other card by sensors L1, L2, and L3 can be interpreted by the microprocessor 204 as the other card moving from top to bottom relative to the card 200. The movement of the other card from top to bottom relative to card 200 may be detected based on a similar sequence of detection by sensors "R1>R2>R3" or "T1>B1". The microprocessor 204 may be configured to detect the transfer gesture based on movement of the other card detected by sensors L1>L2>L3, R1>R2>R3, T1>B1 or a combination thereof. The microprocessor may be configured to initiate a data exchange (e.g., transmit or receive data) with the other data card in response to detecting the transfer gesture.

In one or more embodiments, data card 200 may be configured with a pre-selected distance within which the data card 200 is to detect other cards. For example, the microprocessor 204 may be configured to detect a pairing gesture and/or a transfer gesture when the other card is detected within the pre-selected distance from the data card 200.

Figure 3A:
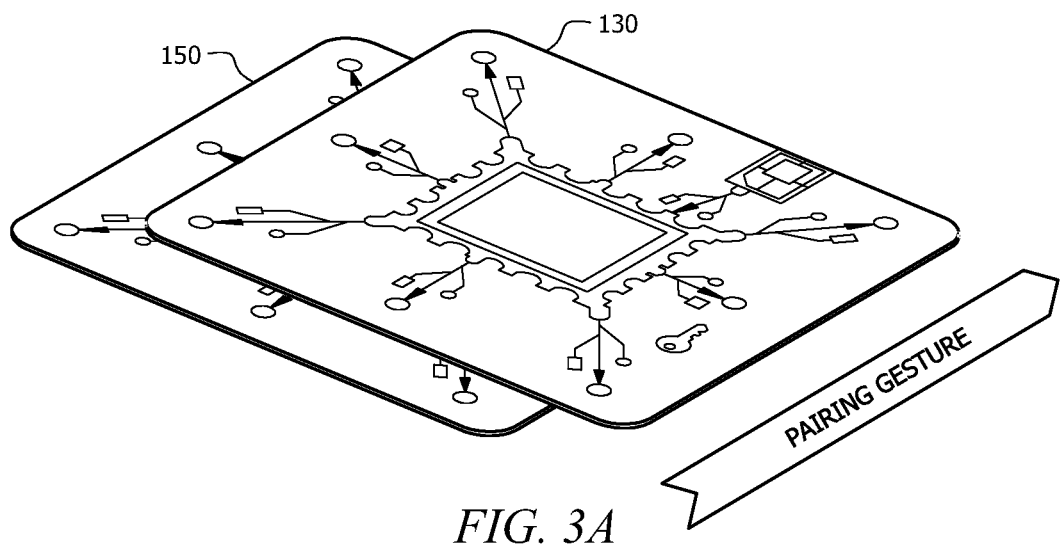
FIG. 3A illustrates an example pairing gesture, in accordance with certain embodiments of the present disclosure.

FIG. 3A illustrates an example pairing gesture, in accordance with certain embodiments of the present disclosure. As shown, first data card 130 can be moved from left to right relative to the second data card 150 in close proximity to each other (e.g., within a pre-selected distance from each other). This relative movement may be detected by sensors 202 (e.g., L1>T1>R1, L3>B1>R3, L2>R2 or a combination thereof) on either or both data cards 130 and 150, which can be interpreted by the respective microprocessors 204 of the data cards 130 and 150 as a pairing gesture. In response to detecting the pairing gesture, the first data card 130 and the second data card 150 may establish a peer-to-peer connection with each other. The peer-to-peer connection between the data cards 130 and 150 may use any well-known communication technology that supports peer-to-peer data communication between two devices. In one embodiment, the peer-to-peer connection may use the Near-Field Communication (NFC) protocol. Each data card 130 and 150 may include the necessary hardware to establish the peer-to-peer connection. For example, each of the data cards 130 and 150 may include a communication module (not shown) that can be configured to use one or more known communication protocols to establish the peer-to-peer connection with other data cards.

Figure 3B:
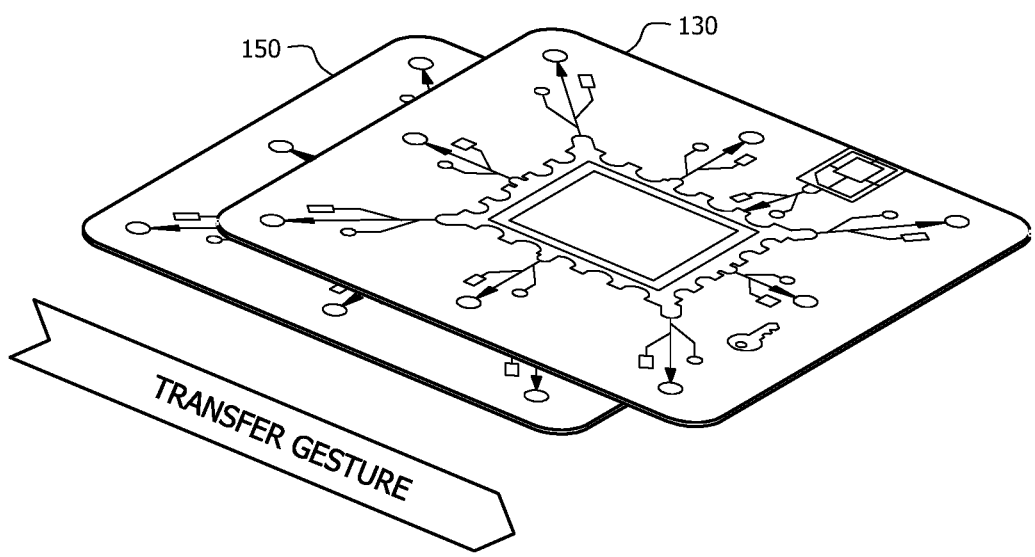
FIG. 3B illustrates an example transfer gesture, in accordance with certain embodiments of the present disclosure.

FIG. 3B illustrates an example transfer gesture, in accordance with certain embodiments of the present disclosure. As shown, first data card 130 can be moved from top to bottom relative to the second data card 150 in close proximity to each other (e.g., within a pre-selected distance from each other). This relative movement may be detected by sensors 202 (e.g., L1>L2>L3, R1>R2>R3, T1>B1 or a combination thereof) on either or both data cards 130 and 150, which can be interpreted by the respective microprocessors 204 of the data cards 130 and 150 as a transfer gesture. In response to detecting the transfer gesture, the first data card 130 and the second data card 150 may exchange data over an already established peer-to-peer connection between the data cards 130 and 150. Data exchange between the first data card 130 and the second data card 150 may include data exchange between the first local data file 132 stored in memory 212 of the first data card 130 and the second local data file 152 stored in memory 212 of the second data card 150.

The microprocessor 204 of the data card 200 may be configured to initiate a data exchange (e.g., data transmission or reception) with another data card (e.g., in response to detecting a transfer gesture) when a peer-to-peer connection is already established between the data card 200 and the other data card. Thus, in order to initiate a data exchange between the first data card 130 and the second data card 150, a pairing gesture may first need to be performed between the two data cards 130 and 150 followed by a transfer gesture between the two data cards 130 and 150.

In one example use case when the first user desires to transfer data from the first local data file 132 stored at the first data card 130 to the second local data file 152 stored at the second data card 150, the first user first performs a pairing gesture by moving the first data card 130 left to right relative to the second data card 150 within a pre-selected distance from the second data card 150. The relative movement of the data cards 130 and 150 is recorded by the sensors 202 on both data cards 130 and 150 and interpreted by respective microprocessors of the data cards 130 and 150 as a pairing gesture. In response to detecting the pairing gesture, the microprocessors 204 of the data cards 130 and 150 establish a peer-to-peer connection between the data cards 130 and 150. The first data card 130 may provide a feedback (e.g., one or more audible beeps, a haptic response etc.) to confirm that the peer-to-peer connection has been successfully established between the first data card 130 and the second data card 150. Similarly, the second data card 150 may provide a feedback (e.g., one or more audible beeps, a haptic response etc.) to confirm that the peer-to-peer connection has been successfully between the data cards 130 and 150. Once the peer-to-peer connection has been successfully established, the first user performs a transfer gesture by moving the first data card 130 top to bottom relative to the second data card 150 within the pre-selected distance from the second data card 150. This relative movement of the data cards 130 and 150 is recorded by the sensors 202 on both data cards 130 and 150 and interpreted by respective microprocessors of the data cards 130 and 150 as a transfer gesture. In response to detecting the transfer gesture, the microprocessor 204 of the first data card 130 may initiate transfer of the data from the first local data file 132 to the second data card 150 over the already established peer-to-peer connection. The second data card 150 may prepare to receive the data from the first data card 130 in response to detecting the transfer gesture. The first data card may provide a feedback (e.g., one or more audible beeps, a haptic response etc.) to confirm that the data has been successfully transferred to the second data card 150. Similarly, the second data card 150 may provide a feedback (e.g., one or more audible beeps, a haptic response etc.) to confirm that that the data reception from the first data card 130 has been successfully completed. The second data card 150 may store the received data in the memory 212 of the second data card 150.

A similar method may be followed by the second user to initiate a data transfer from the second local data file 152 at the second data card 150 to the first local data file 132 at the first data card 130.

It may be noted that that the left to right movement of the data cards for the pairing gesture and the top to bottom movement of the data cards for the transfer gesture is described for exemplary purpose only. It may be appreciated that the pairing gesture may be implemented by a relative movement of data cards in any direction including left to right, right to left, top to bottom or bottom to right. Similarly, the transfer gesture may be implemented by a relative movement of the data cards in any direction including left to right, right to left, top to bottom or bottom to right.

Interaction data may be generated corresponding to each data transfer that occurs between the first data card 130 and the second data card 150. For example, each data transfer occurring between the first data card 130 and the second data card 150 may be recorded as a separate data interaction. A recorded data interaction may include a data transmission or a data reception, whichever the case may be. For example, a data transmission from the first data card 130 and the second data card 150 may be recorded as a data transmission at the first data card 130 and as a data reception at the second data card 150. As shown in FIG. 1, the data interactions between the first data card 130 and the second data card 150 are stored as first interaction data 138 at the first data card 130 and second interaction data 158 at the second data card 150 respectively. A recorded data interaction may include information relating to the type of the data interaction (e.g., data transmission or reception) and the data or portion thereof that was transmitted or received. When in network coverage, each of the first data card 130 and the second data card 150 may be configured to transmit the respective first interaction data 138 and second interaction data 150 to the first data server 110 and second data server 120 respectively.

In one or more embodiments, data card 200 (e.g., first data card 130, second data card 150 or both) may be provided with user interface on one of the faces of the data card.

Figure 4:
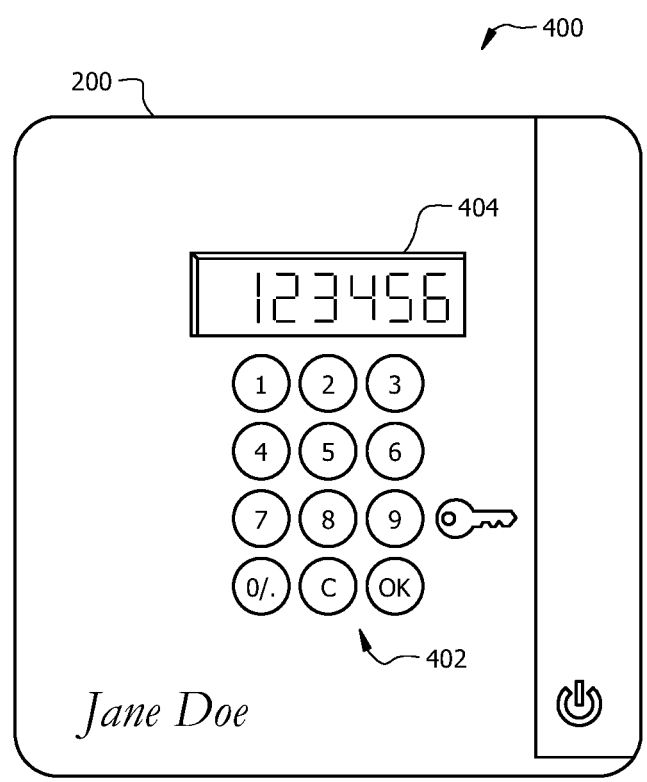
FIG. 4 illustrates an example user interface of a data card as shown in FIG. 2, in accordance with one or more embodiments of the present disclosure.

FIG. 4 illustrates an example user interface 400 of a data card 200 as shown in FIG. 2, in accordance with one or more embodiments of the present disclosure. As shown, user interface 400 of the data card 200 includes a data input device 402 and display 404 on a face of the data card 200. While the data input device 402 is illustrated as a number keypad, it may be appreciated that the data input device 402 may include any known input device including an alphanumeric keypad including letters, numbers and special characters. Further, while display 404 is illustrated as displaying numbers, it may be appreciated that the display 404 can include any known display device, for example, capable of displaying numbers, letters and other characters.

The user interface 400 of the data card 200 may be used by a user to initiate data interactions with other data cards. Following the above example, once a peer-to-peer connection is established between the first data card 130 and the second data card 150, the first user may authenticate the data transfer from the first data card 130 to the second data card 150 by inputting a unique key using the data input device 402. The display 404 may display the characters of the unique key as the user types the characters using the data input device 402. In an additional or alternative embodiment, the first user may use the data input device 402 to specify what portion of data from the first local data file 132 is to be transferred to the second data card 150. The authentication key and/or the input regarding what portion of data is to be transferred may be provided before or after a transfer gesture is performed. The second user may use a similar data input device 402 provided at the second data card 150 to approve a reception of data from the first data card 130. For example, in order to authenticate and approve the data reception from the first data card 130, the second user may input a unique key using the data input device 402 of the second data card 150. The second data card 150 may initiate the data reception from the first data card 130 upon receiving the correct key via the data input device 402. The second user may provide the unique authentication key before or after detecting the transfer gesture.

In one embodiment, the sensors 202 are provided on a first face of the data card 200 and the user interface is provided on a second face of the data card 200.

In an exemplary banking use case, the first data server 110 may be representative of a first bank server and the second data server 120 may be representative of a second bank server. The first data file 112 may be representative of a first bank account of the first user and the first offline data file 114 may be representative of a first offline bank account of the first user linked to the first bank account. Similarly, the second data file 122 may be representative of a second bank account of the second user and the second offline data file 124 may be representative of a second offline bank account of the first user linked to the second bank account. The first data card 130 may be representative of a first money card of the first user that is registered with the first bank server, and the second data card 150 may be representative of a second money cared of the second user that is registered with the second bank server. Generally, the first user may be able to transfer funds from the first bank account of the first user to the second bank account of the second user by logging into a bank portal over the internet using a user device (e.g., smart phone, laptop computer etc.) and initiating an inter-account funds transfer. However, when the first user does not have access to the internet (e.g., when travelling in a remote region with no or unreliable network coverage), the fist user may be unable to login to the bank portal to initiate funds transfer to the second bank account of the second user. In such a case, embodiments of the present disclosure may allow the first user to indirectly transfer funds between the first bank account to the second bank account via an offline funds transfer between cash card 130 and cash card 150. The first user may pre-configure the first bank account to transfer a portion of funds from the first bank account to the first offline account (e.g., when the first cash card is detected outside a designated region). The first cash card may be configured to synchronize the first local data file 132 with the first offline bank account (e.g. periodically). Thus, after a synchronization between the first cash card and the first bank server after the funds are transferred to the first offline account, the first local data file 132 reflects the funds in the first offline account. Similarly, the second cash card may be synchronized with the second data server 120 so that the second local data file 152 reflects the funds in the second offline account of the second user. Now, when the first and second users are collocated and in a region with no network coverage, funds may be exchanged between the first cash card and the second cash card similar to how data is exchanged between the first data card 130 and the second data card 150 as in accordance with embodiments of the present disclosure. When the first and second cash cards are back in network coverage, both cash cards are synchronized with their respective offline accounts such that offline interactions are reflected in the respective offline bank accounts.

Figure 5:
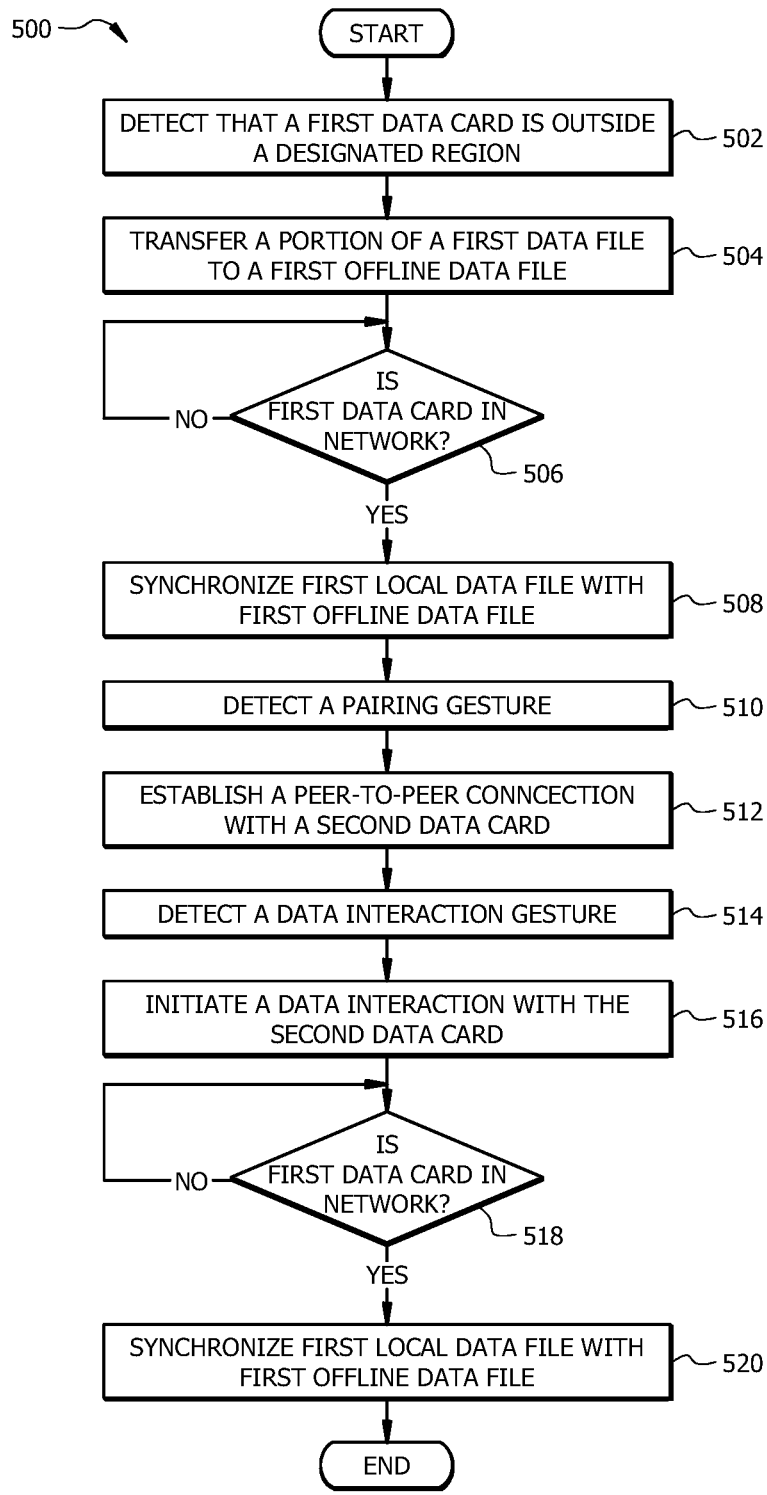
FIG. 5 is a flowchart of an example method for performing a data interaction between a first data card and a second data card, in accordance with certain embodiments of the present disclosure.

FIG. 5 is a flowchart of an example method 500 for performing a data interaction between a first data card and a second data card, in accordance with certain embodiments of the present disclosure. Method 500 can be implemented by the data processing system 100 as shown in FIG. 1 and described above.

At step 502, the first data server 110 detects that a first data card 130 of a first user registered with a first data server 110 is outside a designated geographical region.

As described above with reference to FIG. 1, the data processing system 100 includes the first data server 110, the first data card 130, a second data server 120, and a second data card 150, each capable of connecting to a network 170. First data server 110 may store for the first user, a first data file 112 and a first offline data file 114 associated with the first data file 112. The first user may be registered with the first data server 110 to maintain the first data file 112 and the associated first offline data file 114 at the first data server 110. The first data file 112 may store data for the first user. The first offline data file 114 may be linked to the first data file 112 and may store a portion of the data from the first data file 112. Similarly, the second data server 120 may store for a second user, a second data file 122 and a second offline data file 124 associated with the second data file 122. The second user may be registered with the second data server 120 to maintain the second data file 122 and the associated second offline data file 124 at the second data server 120. The second data file 122 may store data for the second user. The second offline data file 124 may be linked to the second data file 122 and may store a portion of the data from the second data file 122.

A geo-location device (e.g., GPS device 214) may be built into the first data card 130. The GPS device 214 may detect a geographical location of the first data card 130. For example, the GPS device 214 may be configured to detect the geographical location of the first data card 130 according to a pre-configured schedule (e.g., periodically). The geo-location data obtained from the GPS device 214 may be recorded and stored in the memory device 212 of the first data card 130. For example, the first data card 130 may store the geo-location data obtained from the GPS device 214 of the first data card 130 as first geo-location data 136. The first data card 130 may be configured to transmit the first geo-location data 136 to the first data server 110. The first data server 110 may be configured to determine whether the first data card 130 is outside a designated geographical region based on the first geo-location data 136 received from the first data card 130. The designated region may generally have network coverage and at least a portion of a region outside the designated region may not have network coverage. For example, when the first geo-location data 136 received from the first data card 130 includes GPS coordinates that are outside the designated region, the first data server 110 may determine that the first data card 130 is outside the designated region.

At step 504, the first data server 110 transfers a portion of the data from the first data file 112 to the first offline data file 114.

As described above, the first data server 110 may be configured to activate the first offline data file 114 based on the first geo-location data 136 received from the first data card 130. For example, the first data server 110 may be configured to keep the first offline data file 114 and the first data card 130 de-activated until the first data card 130 is detected outside the designated region. De-activating the first offline data file 114 may include deleting all data from the first offline data file 114. This may include transferring all data from the first offline data file 114 to the first data file 112. When the first offline data file 114 is empty, a next data synchronization between the first offline data file 114 and the first local data file 132 deletes all data from the first local data file 132 and consequently deactivates the first data card 130. The first data server 110 may be configured to activate the first offline data file 114 and the first local data file 132 in response to detecting that the first data card is outside the designated region. Activating the first offline data file 114 may include transferring a pre-selected portion of data from the first data file 112 to the first offline data file 114. When the first offline data file 114 has data, a next data synchronization between the first offline data file 114 and the first local data file 132 copies the data from the first offline data file 114 to the first local data file 132, consequently activating the first data card 130 for offline data exchanges with another data card (e.g., second data card 150).

At step 506, the first data card 130 checks whether the first data card 130 is connected to a network (e.g., network 170 including the internet). If the first data card 130 is not connected to the network 170, method 500 continues monitoring (e.g., periodically) for a connection to the network 170. On the other hand, if the first data card 130 is connected to the network 170, method 500 proceeds to step 508.

At step 508, the first data card 130 synchronizes data stored locally in the first local data file 132 with the first offline data file 114 stored at the first data server 110.

As described above, a SIM 208 may be included in the first data card 130 that may be configured to connect the first data card 130 to a cellular data network (e.g., a portion of network 170) when the first data card 130 is within network coverage. The SIM 208 allows the first data card 130 to connect to a cellular base station 210 to provide network access to the first data card 130. When in network coverage and connected to the data network, first data card 130 may be configured to synchronize (e.g. periodically) contents of the first local data file 132 with the first offline data file 114 stored at the first data server 110. Similarly, when in network coverage and connected to a data network, second data card 150 may be configured to synchronize (e.g. periodically) contents of the second local data file 152 with the second offline data file 124 stored at the second data server 120.

At step 510, the first data card 130 detects a pairing gesture performed between the first data card 130 and the second data card 150.

As described above sensors 202 included in each of the first data card 130 and the second data card 150 may be configured to detect relative movement of the data cards 130 and 150 in a particular direction within close proximity of each other. For example, sensors 202 of the first data card 130 can detect the second data card 150 moving in close proximity (e.g., within a pre-selected distance) to the first data card 130 in a particular direction. As shown in FIG. 2, sensors 202 may include three left sensors L1, L2 and L3 provided near a left edge of the data card 200 (e.g., representing first data card 130 and/or second data card 150), three right sensors R1, R2, and R3 provided near a right edge of the data card 200, one top sensor T1 provided near the center of a top edge of the data card 200, and one bottom sensor B1 provided near the center of a bottom edge of the data card 200. Each of the sensors 202 may include any type of sensor that can detect movement of another data card within a pre-selected distance from the data card 200. For example, one or more of the sensors 202 may include a proximity sensor capable of detecting the presence of nearby objects within a nominal range. Data card 200 may be configured to locally store sensor data collected by each sensor 202 in memory device 212. For example, first data card 130 may store sensor data collected from sensors 202 as first sensor data 134. Similarly, second data card 150 may store sensor data collected from similar sensors 202 as second sensor data 154.

Microprocessor 204 of the data card 200 may be configured to detect pre-configured gestures related to a data interaction between data card 200 and another data card, based on the sensor data collected from sensors 202. For example, when the sensors 202 detect another data card moving from left to right relative to the data card 200 (e.g., direction aligned with L1>T1>R1, L3>B1>R3, L2>R2 or a combination thereof), the microprocessor 204 may be configured to detect a pairing gesture. For example, when another card is moved from left to right direction over data card 200 in close proximity, each of the sensors L1, T1, and R1 detect the other card in close proximity to the sensor one by one in sequence. That is, L1 first detects the other card in close proximity of L1, then T1 detects the other card in close proximity of T1, and finally R1 detects the other card in close proximity of the R1. This sequence of detection of the other card by sensors L1, T1, and R1 can be interpreted by the microprocessor 204 as the other card moving from left to right relative to the card 200. The movement of the other card from left to right relative to card 200 may be detected based on a similar sequence of detection by sensors "L3>B1>R3" or "L2>R2". The microprocessor 204 may be configured to detect the pairing gesture based on movement of the other card detected by sensors L1>T1>R1, L3>B1>R3, L2>R2 or a combination thereof. For example, as shown in FIG. 3A, first data card 130 can be moved from left to right relative to the second data card 150 in close proximity to each other (e.g., within a pre-selected distance from each other). This relative movement may be detected by sensors 202 (e.g., L1>T1>R1, L3>B1>R3, L2>R2 or a combination thereof) on either or both data cards 130 and 150, which can be interpreted by the respective microprocessors 204 of the data cards 130 and 150 as a pairing gesture.

At step 512, the first data card 130 establishes a peer-to-peer connection with the second data card 150 in response to detecting a pairing gesture performed between the first data card 130 and the second data cared 150. The peer-to-peer connection between the data cards 130 and 150 may use any well-known communication technology that supports peer-to-peer data communication between two devices. In one embodiment, the peer-to-peer connection may use the Near-Field Communication (NFC) protocol. Each data card 130 and 150 may include the necessary hardware to establish the peer-to-peer connection. For example, each of the data cards 130 and 150 may include a communication module (not shown) that can be configured to use one or more known communication protocols to establish the peer-to-peer connection with other data cards.

At step 514, the first data card 130 detects a data interaction gesture performed between the first data card 130 and the second data card 150. As described above, when the sensors 202 of the data card 200 (e.g., representing first data card 130 and/or second data card 150) detect another data card moving from top to bottom relative to the data card 200 (e.g., direction aligned with L1>L2>L3, R1>R2>R3, T1>B1 or a combination thereof), the microprocessor 204 may be configured to detect a transfer gesture. For example, when another card is moved from top to bottom direction over card 200 in close proximity, each of the sensors L1, L2, and L3 detect the other card in close proximity to the sensor one by one in sequence. That is, L1 first detects the other card in close proximity of L1, then L2 detects the other card in close proximity of L2, and finally L3 detects the other card in close proximity of the L3. This sequence of detection of the other card by sensors L1, L2, and L3 can be interpreted by the microprocessor 204 as the other card moving from top to bottom relative to the card 200. The movement of the other card from top to bottom relative to card 200 may be detected based on a similar sequence of detection by sensors "R1>R2>R3" or "T1>B1". The microprocessor 204 may be configured to detect the transfer gesture based on movement of the other card detected by sensors L1>L2>L3, R1>R2>R3, T1>B1 or a combination thereof. The microprocessor may be configured to initiate a data exchange (e.g., transmit or receive data) with the other data card in response to detecting the transfer gesture. For example, as shown in FIG. 3B, first data card 130 can be moved from top to bottom relative to the second data card 150 in close proximity to each other (e.g., within a pre-selected distance from each other). This relative movement may be detected by sensors 202 (e.g., L1>L2>L3, R1>R2>R3, T1>B1 or a combination thereof) on either or both data cards 130 and 150, which can be interpreted by the respective microprocessors 204 of the data cards 130 and 150 as a transfer gesture.

At step 516, the first data card 130 exchanges data with the second data cared 150 after detecting the data interaction gesture (e.g., data transfer gesture) between the first data card 130 and second data card 150. The data exchange may include transmitting data to the second data card 150 or receiving data from the second data card 150.

As described above, in response to detecting the transfer gesture, the first data card 130 and the second data card 150 may exchange data over an already established peer-to-peer connection between the data cards 130 and 150. Data exchange between the first data card 130 and the second data card 150 may include data exchange between the first local data file 132 stored in memory 212 of the first data card 130 and the second local data file 152 stored in memory 212 of the second data card 150. For example, the data exchange between the first data card 130 and the second data card 150 may include the first data card 130 initiating a data transfer to transfer at least a portion of data stored in the first local data file 132 to the second local data file 152 at the second data card 150. In an additional or alternative embodiment, the data exchange between the first data card 130 and the second data card 150 may include the first data card 130 receiving at least a portion of the data stored in the second local data file 152 at the second data card 150. The received data may be stored in the first local data file 132.

As described above with reference to FIG. 2, the microprocessor 204 of the data card 200 may be configured to initiate a data exchange (e.g., data transmission or reception) with another data card (e.g., in response to detecting a transfer gesture) when a peer-to-peer connection is already established between the data card 200 and the other data card. Thus, in order to initiate a data exchange between the first data card 130 and the second data card 150, a pairing gesture may first need to be performed between the two data cards 130 and 150 followed by a transfer gesture between the two data cards 130 and 150.

In one example use case when the first user desires to transfer data from the first local data file 132 stored at the first data card 130 to the second local data file 152 stored at the second data card 150, the first user first performs a pairing gesture by moving the first data card 130 left to right relative to the second data card 150 within a pre-selected distance from the second data card 150. The relative movement of the data cards 130 and 150 is recorded by the sensors 202 on both data cards 130 and 150 and interpreted by respective microprocessors of the data cards 130 and 150 as a pairing gesture. In response to detecting the pairing gesture, the microprocessors 204 of the data cards 130 and 150 establish a peer-to-peer connection between the data cards 130 and 150. The first data card 130 may provide a feedback (e.g., one or more audible beeps, a haptic response etc.) to confirm that the peer-to-peer connection has been successfully established between the first data card 130 and the second data card 150. Similarly, the second data card 150 may provide a feedback (e.g., one or more audible beeps, a haptic response etc.) to confirm that the peer-to-peer connection has been successfully between the data cards 130 and 150. Once the peer-to-peer connection has been successfully established, the first user performs a transfer gesture by moving the first data card 130 top to bottom relative to the second data card 150 within the pre-selected distance from the second data card 150. This relative movement of the data cards 130 and 150 is recorded by the sensors 202 on both data cards 130 and 150 and interpreted by respective microprocessors of the data cards 130 and 150 as a transfer gesture. In response to detecting the transfer gesture, the microprocessor 204 of the first data card 130 may initiate transfer of the data from the first local data file 132 to the second data card 150 over the already established peer-to-peer connection. The second data card 150 may prepare to receive the data from the first data card 130 in response to detecting the transfer gesture. The first device may provide a feedback (e.g., one or more audible beeps, a haptic response etc.) to confirm that the data has been successfully transferred to the second data card 150. Similarly, the second data card 150 may provide a feedback (e.g., one or more audible beeps, a haptic response etc.) to confirm that that the data reception from the first data card 130 has been successfully completed. The second data card 150 may store the received data in the memory 212 of the second data card 150.

A similar method may be followed by the second user to initiate a data transfer from the second local data file 152 at the second data card 150 to the first local data file 132 at the first data card 130.

At step 518, the first data card 130 checks whether the first data card 130 is connected to the network (e.g., network 170 including the internet). If the first data card 130 is not connected to the network 170, method 500 continues monitoring (e.g., periodically) for a connection to the network 170. On the other hand, if the first data card 130 is connected to the network 170, method 500 proceeds to step 520.

At step 520, the first data card 130 synchronizes data stored locally in the first local data file 132 with the first offline data file 114 stored at the first data server 110. Since the data synchronization is after the data exchange between the first data card 130 and second data card 150, the first offline data file 114 reflects the changes to the first local data file 132 right after the synchronization is completed. For example, if a portion of data from the first local data file 132 was transferred to the second data card, the portion of data is deleted from the first offline data file 114 after the synchronization is completed. Similarly, if a portion of data was received from the second data card 150 and stored in the first local data file 132, the portion of data is added to the first offline data file 114 after the synchronization is completed.

Figure 6:
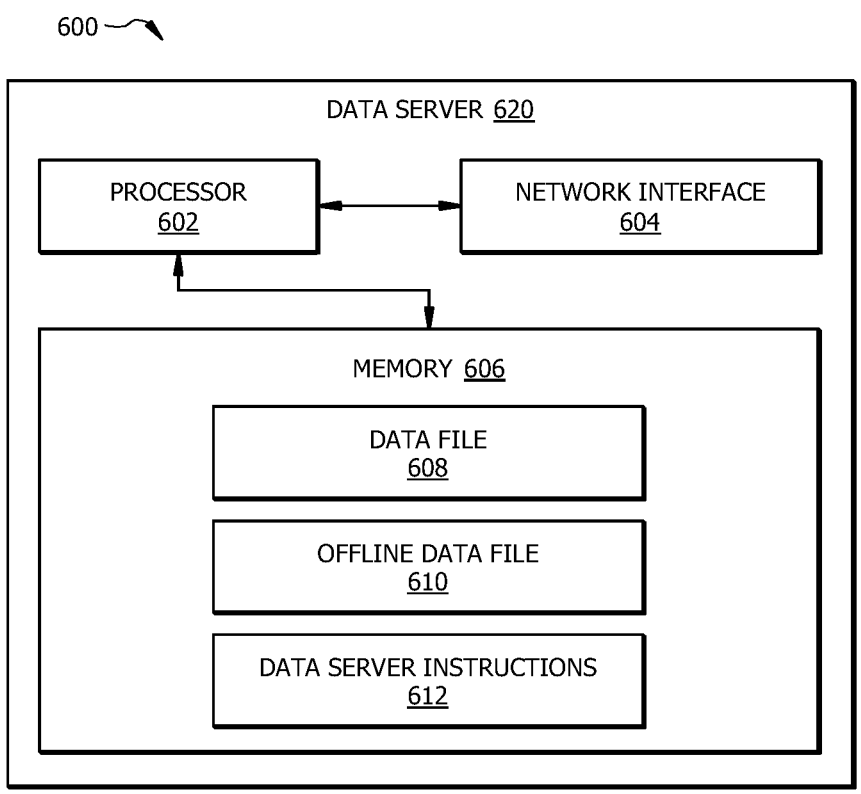
FIG. 6 illustrates an example schematic diagram of a data server illustrated in FIG. 1, in accordance with one or more embodiments of the present disclosure.

FIG. 6 illustrates an example schematic diagram 600 of a data server illustrated in FIG. 1, in accordance with one or more embodiments of the present disclosure. Data server 620 may be representative of the first data server 110 and/or the second data server 120 as shown in FIG. 1.

Data server 620 includes a processor 602, a memory 606, and a network interface 604. The data server 620 may be configured as shown in FIG. 6 or in any other suitable configuration.

The processor 602 comprises one or more processors operably coupled to the memory 606. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., data server instructions 612) to implement the data server 620. In this way, processor 602 may be a special-purpose computer designed to implement the functions disclosed herein. In one or more embodiments, the data server 620 is implemented using logic units, FPGAs, ASICs, DSPs, or any other suitable hardware. The data server 620 is configured to operate as described with reference to FIGS. 1-5. For example, the data server 620 may be configured to perform at least a portion of the method 500 as described in FIG. 5.

The memory 606 comprises one or more disks, tape drives, or solid-state drives, and may be used as an over-flow data storage device, to store programs when such programs are selected for execution, and to store instructions and data that are read during program execution. The memory 606 may be volatile or non-volatile and may comprise a read-only memory (ROM), random-access memory (RAM), ternary content-addressable memory (TCAM), dynamic random-access memory (DRAM), and static random-access memory (SRAM).

The memory 606 is operable to store a data file 608, an offline data file 610 and data server instructions 612. The data file 608 may be representative of the first data file 112 or the second data file 122. The offline data file 610 may be representative of the first offline data file 114 or the second offline data file 124. The data server instructions 612 may include any suitable set of instructions, logic, rules, or code operable to execute the data server 620.

The network interface 604 is configured to enable wired and/or wireless communications. The network interface 604 is configured to communicate data between the data server 620 and other devices, systems, or domains (e.g. other data servers, data cards etc.). For example, the network interface 604 may comprise a Wi-Fi interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

It may be noted that each of the first data card 130 and the second data card 150 may be implemented similar to the data server 620. For example, the each of the first data card 130 and the second data card 150 may include a processor and a memory storing instructions to implement the respective functionality as described above when executed by the processor. The memory of each the first data card 130 may be configured to store the first local data file 132, the first sensor data 134, the first geo-location data 136 and the first interaction data 138. Similarly, the memory of the second data card 150 may be configured to store the second local data file 152, the second sensor data 154, the second geo-location data 156 and the second interaction data 158.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a first server storing a first data file for a first user;
a second server storing a second data file for a second user;
a first data card of the first user registered with the first server, wherein the first data card has a first set of sensors provided on a first face of the first data card and a first data input device provided on a second face of the first data card, wherein the first data card locally stores a portion of the first data file;
a second data card of the second user registered with the second server, wherein the second data card is associated with the second data file;
the first data card comprising at least one processor configured to:
receive a first signal from at least one sensor of the first set of sensors;
detect, based on the received first signal, a movement of the first data card relative to the second data card in a first direction within a pre-selected distance from the second data card;
interpret the relative movement of the first data card in the first direction as a card pairing gesture;
establish a peer-to-peer connection between the first data card and the second data card, in response to the card pairing gesture; and
transmit a portion of the first data file from the first data card to the second data card over the peer-to-peer connection.

2. The system of claim 1, wherein:
the first server stores a first offline data file;
the first data card comprises a geo-location device to detect a geographical location of the first data card;
the first server is configured to:
receive a geo-location signal from the first data card;
detect, based on the geo-location signal that the first data card is outside a designated region; and
in response, transfer the portion of the first data file to the first offline data file.

3. The system of claim 2, wherein the portion of the first data file is pre-selected for transferring to the first offline data file.

4. The system of claim 2, wherein:
the first data card further comprises a first Subscriber Identity Module (SIM) for connecting to a data network; and
the at least one processor of the first data card is further configured to:
detect that the first data card is connected to the data network via the first SIM; and
synchronize data locally stored at the first data card with the first offline data file over the data network.

5. The system of claim 4, wherein:
the second data card comprises a second Subscriber Identity Module (SIM) for connecting to the data network; and
the second data card comprises at least one second processor configured to:
detect that the second data card is connected to the data network via the second SIM; and
synchronize over the data network data stored locally at the second data card with the second data file or a second offline data file associated with the second data file at the second server.

6. The system of claim 1, wherein:
the first data card further comprises a haptic device;
the at least one processor is further configured to:
trigger a first haptic response by the haptic device in response to successfully establishing the peer-to-peer connection with the second data card; and
trigger a second haptic response by the haptic device in response to successfully completing transmission of the portion of the first data file to the second data card.

7. The system of claim 1, wherein the first server comprises the second server or the second server comprises the first server.

8. The system of claim 1, wherein the peer-to-peer connection comprises a Near-Field Communication (NFC) protocol.

9. A system comprising:
a first server storing a first data file for a first user;

a second server storing a second data file for a second user;

a first data card of the first user registered with the first server, wherein the first data card has a first set of sensors provided on a first face of the first data card, wherein the first data card is associated with the first data file;

a second data card of the second user registered with the second server, wherein the second data card locally stores a portion of the second data file;

wherein the first data card comprises at least one processor configured to:
receive a first signal from at least one sensor of the first set of sensors;
detect, based on the received first signal, a movement of the first data card relative to the second data card in a first direction within a pre-selected distance from the second data card;
interpret the relative movement of the first data card in the first direction as a card pairing gesture;
establish a peer-to-peer connection with the second data card, in response to the card pairing gesture;
receive a portion of the second data file from the second data card over the peer-to-peer connection; and
a memory coupled to the at least one processor and configured to store the received portion of the second data file.

10. The system of claim 9, wherein:
the first data card further comprises a first data input device provided on a second face of the first data card;
the at least one processor is further configured to:
receive a confirmation via the first data input device of receiving the portion of the second data file from the second data card; and
receiving the portion of the second data file from the second data card after receiving the confirmation.

11. The system of claim 10, wherein:
the first server stores a first offline data file associated with the first data file;
the first data card further comprises a first Subscriber Identity Module (SIM) for connecting to a data network; and
the at least one processor of the first data card is further configured to:
detect that the first data card is connected to the data network via the first SIM; and
synchronize data locally stored in the memory of the first data card with the first offline data file over the data network, wherein synchronizing includes transmitting the portion of the second data file to the second server for storing in the first offline data file.

12. The system of claim 11, wherein:
the second data card comprises a second Subscriber Identity Module (SIM) for connecting to the data network; and
the second data card comprises at least one second processor configured to:
detect that the second data card is connected to the data network via the second SIM; and
synchronize over the data network data stored locally at the second data card with the second data file or a second offline data file associated with the second data file at the second server.

13. The system of claim 9, wherein:
the first data card further comprises a haptic device;
the at least one processor is further configured to:
trigger a first haptic response by the haptic device in response to successfully establishing the peer-to-peer connection with the second data card; and
trigger a second haptic response by the haptic device in response to successfully completing reception of the portion of the second data file from the second data card.

14. The system of claim 9, wherein the first server comprises the second server or the second server comprises the first server.

15. The system of claim 9, wherein the peer-to-peer connection comprises a Near-Field Communication (NFC) protocol.

* * * * *